US012416151B2

(12) United States Patent
Yin et al.

(10) Patent No.: US 12,416,151 B2
(45) Date of Patent: Sep. 16, 2025

(54) WAFFLE SLAB AND STRUCTURES AND METHOD OF MANUFACTURING THE SAME

(71) Applicant: RUENTEX ENGINEERING & CONSTRUCTION CO., LTD., Taipei (TW)

(72) Inventors: Samuel Yin, Taipei (TW); Kun-Jung Hsu, Taipei (TW); Jui-Chen Wang, Taipei (TW); Jhih-Syuan Chen, Taipei (TW)

(73) Assignee: RUENTEX ENGINEERING & CONSTRUCTION CO., LTD., Taipei (TW)

(*) Notice: Subject to any disclaimer, the term of this patent is extended or adjusted under 35 U.S.C. 154(b) by 141 days.

(21) Appl. No.: 18/242,698

(22) Filed: Sep. 6, 2023

(65) Prior Publication Data

US 2024/0109224 A1 Apr. 4, 2024

(30) Foreign Application Priority Data

Sep. 30, 2022 (TW) ................................ 111137288

(51) Int. Cl.
*E04B 5/43* (2006.01)
*B28B 23/02* (2006.01)
(Continued)

(52) U.S. Cl.
CPC .............. *E04B 5/43* (2013.01); *B28B 23/024* (2013.01); *E04B 5/04* (2013.01); *E04B 5/14* (2013.01); *E04B 5/21* (2013.01); *E04C 3/20* (2013.01); *E04C 5/0609* (2013.01); *E04G 11/40* (2013.01); *E04G 17/16* (2013.01)

(58) Field of Classification Search
CPC ..... E04B 5/04; E04B 5/14; E04B 5/21; E04B 5/43; E04C 3/20; E04C 5/0609; E04G 11/40; E04G 17/16; B28B 23/024
See application file for complete search history.

(56) References Cited

U.S. PATENT DOCUMENTS 2,379,636 A * 7/1945 Hedgren .................. E04C 3/20 52/745.05
4,272,465 A * 6/1981 Hough .................... E04G 11/40 249/20

(Continued)

FOREIGN PATENT DOCUMENTS

CN 110644664 A * 1/2020
CN 113622572 A * 11/2021 ............... E04B 5/21

(Continued)

*Primary Examiner* — Jessie T Fonseca

(74) *Attorney, Agent, or Firm* — Juan Carlos A. Marquez; Marquez IP Law Office, PLLC

(57) ABSTRACT

A method of manufacturing a waffle slab includes providing a bottom mold separately on columns and exposing joint heads of the columns from the bottom mold; providing first sets of beam bars separately on the bottom mold to be parallel along a first direction; and providing second sets of beam bars separately on the bottom mold to be parallel along a second direction, wherein the second sets b of beam bars are configured to intersect with the first sets of beam bars without interference and together they form accommodation spaces for waffle molds.

14 Claims, 20 Drawing Sheets

(51) Int. Cl.

| | |
|---|---|
| ***E04B 5/04*** | (2006.01) |
| ***E04B 5/14*** | (2006.01) |
| ***E04B 5/21*** | (2006.01) |
| ***E04C 3/20*** | (2006.01) |
| ***E04C 5/06*** | (2006.01) |
| ***E04G 11/40*** | (2006.01) |
| ***E04G 17/16*** | (2006.01) |

(56) References Cited

U.S. PATENT DOCUMENTS

| | | | | |
|---|---|---|---|---|
| 10,125,457 | B1 * | 11/2018 | Yin | E01D 19/125 |
| 10,626,612 | B2 * | 4/2020 | Yin | B21F 27/125 |
| 11,326,360 | B2 * | 5/2022 | Yin | B23Q 7/001 |
| 2002/0092249 | A1 * | 7/2002 | Yin | E04B 5/026<br>52/263 |
| 2016/0108618 | A1 * | 4/2016 | Buzimkic | E04C 2/06<br>52/649.1 |
| 2016/0230386 | A1 * | 8/2016 | Zavitz | E04B 5/43 |
| 2019/0078314 | A1 * | 3/2019 | Yin | E04B 5/48 |
| 2019/0085562 | A1 * | 3/2019 | Yin | B21F 27/125 |

FOREIGN PATENT DOCUMENTS

| | | | | |
|---|---|---|---|---|
| CN | 113818631 | A * | 12/2021 | |
| CN | 115492232 | A * | 12/2022 | |
| KR | 102177979 | B1 * | 11/2020 | |
| TW | 521776 | U | 2/2003 | |
| WO | WO-2010122177 | A2 * | 10/2010 | E04B 5/43 |
| WO | WO-2014199402 | A1 * | 12/2014 | E04B 1/21 |
| WO | WO-2021116779 | A1 * | 6/2021 | |

* cited by examiner 3
3
3
3
3
3
7
4
12

WAFFLE SLAB AND STRUCTURES AND METHOD OF MANUFACTURING THE SAME

CROSS-REFERENCE

This application claims priority to Taiwan application No. 111137288 filed on Sep. 30, 2022, which is incorporated herein by reference in its entirety.

TECHNICAL FIELD

The present disclosure relates to a building structure and a method for manufacturing the same, and more particularly to a waffle slab, a structure and a method of manufacturing the same.

BACKGROUND

Waffle slabs are widely used in constructing the floors of high-tech fabs for carrying machines and equipment. As a robust structural system with effective vibration isolation of machines and equipment, waffle slabs are capable of minimizing the impact from various sources such as pumps, fans, piping, ducts within the building, and even earthquakes.

Precast columns are manufactured in a controlled factory setting by pouring concrete into reusable molds, allowing it to solidify and harden, and then transporting the finished columns to the construction site for installation. Precast columns, compared to the columns made on construction sites, have the advantages of environmental stability, no weather considerations, less need for skilled labor, and standardized operation procedures. In addition, on construction sites, mechanical equipment can be used to assemble and lift the precast columns and no external scaffolding is required for workers to assemble said columns.

A construction method of placing waffle slabs on precast columns combines the advantages of both systems. However, since waffle slabs have many perforations and reinforcement structures around the perforations to provide the required strength to the waffle slabs, the above construction method involves settings of the waffle mold, settings of reinforcement ties, stirrups and settings of formwork, which need to be carried out at a certain height above the precast columns. Consequently, such a construction method involves a relatively high level of difficulty and complexity.

Thus, to solve the aforementioned problems, it is desirable to provide a systematic and efficient method of manufacturing a waffle slab on precast columns.

SUMMARY

An embodiment of the present disclosure provides a method of manufacturing a waffle slab on multiple columns at intervals. The method includes providing a bottom mold separately on multiple columns and exposing joint heads of the multiple columns from a top surface of the bottom mold; providing multiple first sets of beam bars separately on the bottom mold so that the multiple first sets of beam bars are parallel to each other along a first direction, wherein the multiple first sets of beam bars each includes: multiple first rebar cages disposed along the first direction at intervals, and multiple first upper rebars and multiple first lower rebars that both penetrate through the inside of the multiple first rebar cages and are respectively affixed to the upper portions and lower portions of the multiple first rebar cages; providing multiple second sets of beam bars separately on the bottom mold so that the multiple second sets of beam bars are parallel to each other along a second direction, the second direction being different from the first direction, wherein the multiple second sets of beam bars each includes: multiple second rebar cages separately disposed along the second direction; and multiple second upper rebars penetrating through the inside of the multiple second rebar cages and affixed to the upper portions of the multiple the second rebar cages, wherein the multiple second upper rebars are attached to parts of the multiple first upper rebars that are located between two of the multiple first rebar cages; and providing and penetrating multiple second lower rebars through an inside of the multiple second rebar cages and affixing the multiple second lower rebars to the lower portions of the multiple the second rebar cages; wherein the multiple second sets of beam bars are configured to intersect with the multiple first sets of beam bars without interference, so that the multiple first sets of beam bars and the multiple second sets of beam bars together form multiple accommodation spaces therebetween.

Another embodiment of the present disclosure provides a waffle slab structure, including: a bottom mold disposed on multiple columns disposed at intervals, wherein a joint head of each of the multiple columns is exposed from a top surface of the bottom mold; multiple first sets of beam bars disposed separately on the bottom mold that are parallel to each other along a first direction, wherein the multiple first sets of beam bars each includes: multiple first rebar cages disposed along the first direction at intervals, and multiple first upper rebars and multiple first lower rebars that both penetrate through an inside of the multiple first rebar cages and are respectively affixed to the upper portions and lower portions of the multiple first rebar cages; multiple second sets of beam bars disposed separately on the bottom mold that are parallel to each other along a second direction, the second direction being different from the first direction, wherein the multiple second sets of beam bars each includes: multiple second rebar cages separately disposed along the second direction; and multiple second upper rebars and multiple second lower rebars that both penetrate through an inside of the multiple second rebar cages and are respectively affixed to the upper portions and lower portions of the multiple second rebar cages, wherein the multiple second upper rebars are attached to parts of the multiple first upper rebars that are located between two of the multiple first rebar cages; wherein the multiple second sets of beam bars are configured to intersect with the multiple first sets of beam bars without interference, so that the multiple first sets of beam bars and the multiple second sets of beam bars together form multiple accommodation spaces therebetween; and multiple waffle molds are disposed in the multiple accommodation spaces.

BRIEF DESCRIPTION OF THE DRAWINGS

The drawings described below are for illustrative purposes only, and are not intended to limit the scope of the present disclosure in any way.

DETAILED DESCRIPTION OF THE DISCLOSURE

Embodiments of the present disclosure, including various examples, will be described in detail below with reference to the accompanying drawings. It should be noted that the content of the implementation mode of this case is only used to illustrate a specific aspect of this disclosure, and is not intended to limit the scope of disclosure requested in this case.

Figure 1:
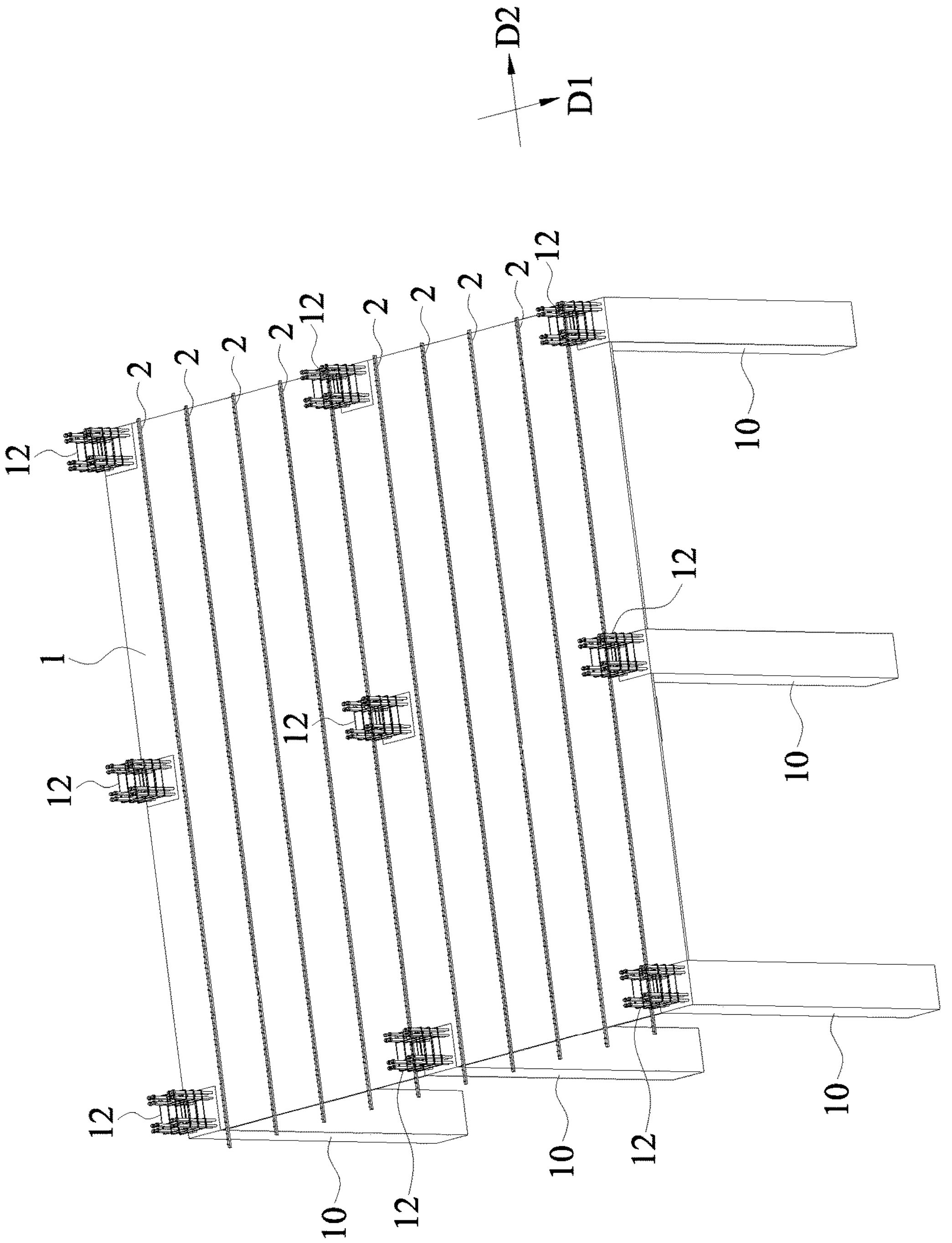
FIG. 1 is a schematic view showing an embodiment of the present disclosure.

FIG. 1 is a schematic view showing an embodiment of the present disclosure, which shows that a bottom mold 1 is provided and disposed on multiple columns 10 arranged at intervals. As shown in FIG. 1, nine columns 10 are arranged at intervals and the tops of the nine columns 10 define a rectangular plane. The bottom mold 1 is placed on top of these columns 10, and is coplanar with the rectangular plane. The joint head 12 of each of the columns 10 is exposed from a top surface of the bottom mold 1. In this embodiment, the plane has a first direction D1 and a second direction D2 in which the first direction D1 and the second direction D2 are substantially perpendicular to each other. In some embodiments, the columns 10 are precast columns. As shown in FIG. 1, multiple rails 2 are arranged on the bottom mold 1 at intervals along the second direction D2.

Figure 2:
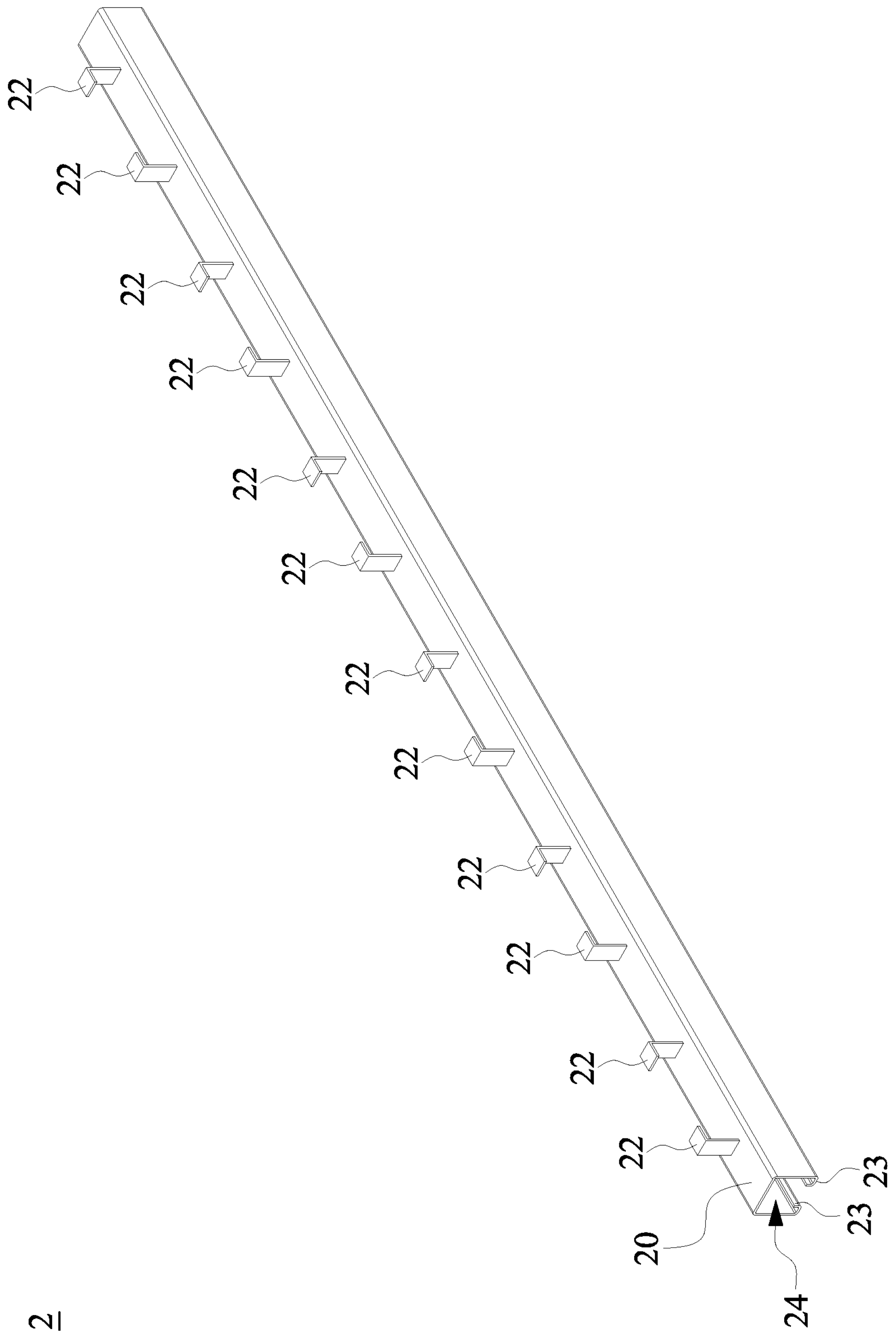
FIG. 2 is a schematic view of the rail shown in FIG. 1.

FIG. 2 is a schematic view of the suspension rail 2 shown in FIG. 1. Each of the rails 2 includes an elongated trough-shaped body 20 and multiple supports 22 disposed on the elongated trough-shaped body 20 at intervals. The edge of the elongated trough-shaped body 20 includes two opposite bent portions 23. An opening 24 is formed between the bent portions 23, and the multiple supports 22 are located on the opposite side of the opening 24 with respect to the bent portions 23. In addition, the openings 24 of the elongated trough-shaped bodies 20 of the multiple rails 2 are configured to face the bottom mold 1 (see FIG. 1).

Figure 3:
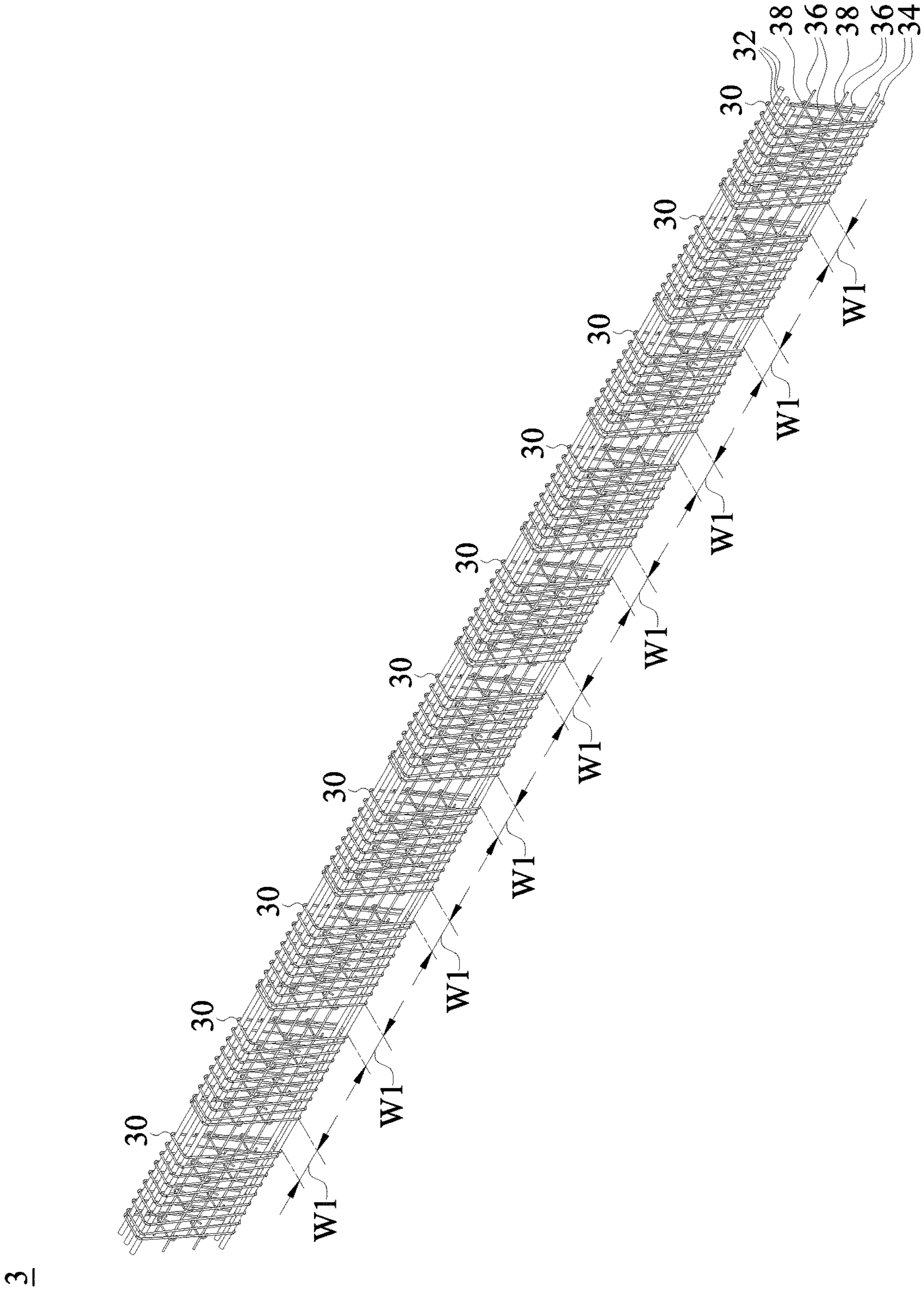
FIG. 3 is a schematically perspective view of a first set of beam bars, in accordance with the embodiment of the present disclosure.

FIG. 3 is a schematically perspective view of a first set of beam bars 3, in accordance with the embodiment of the present disclosure. The first sets of beam bars 3 includes multiple first rebar cages 30, multiple first upper rebars 32 and multiple first lower rebars 34. The multiple first upper rebars 32 and the multiple first lower rebars 34 penetrate through an inside of the multiple first rebar cages 30 and are affixed to the upper and lower portions of the multiple first rebar cages 30, respectively. The multiple first rebar cages 30 are spaced apart from each other and form multiple gaps W1. As shown in FIG. 3, three first upper rebars 32 are fixed to the upper portions of the multiple first rebar cages 30 from the inside of the multiple first rebar cages 30, and two first lower rebars 34 are fixed to the lower portions of the multiple first rebar cages 30 from the inside of the multiple first rebar cages 30.

In this embodiment, each of the first set of beam bars 3 includes multiple first waist bars 36 and multiple first tie bars 38. The multiple first waist bars 36 are located between the multiple first upper rebars 32 and the multiple first lower rebars 34, and are arranged to be substantially parallel to the multiple first upper rebars 32 and the multiple first lower rebars 34. The multiple first tie bars 38 are used to fix the multiple first waist bars 36 for enhancing the strength of the first set of beam bars 3. As shown in FIG. 3, there are four first waist bars 36 in this embodiment, two of which are close to the multiple first upper rebars 32, and are fixed by the upper first waist bars 36, the other two of which are close to the multiple first lower rebars 34 and are fixed by the lower first waist bars 36.

Figure 4:
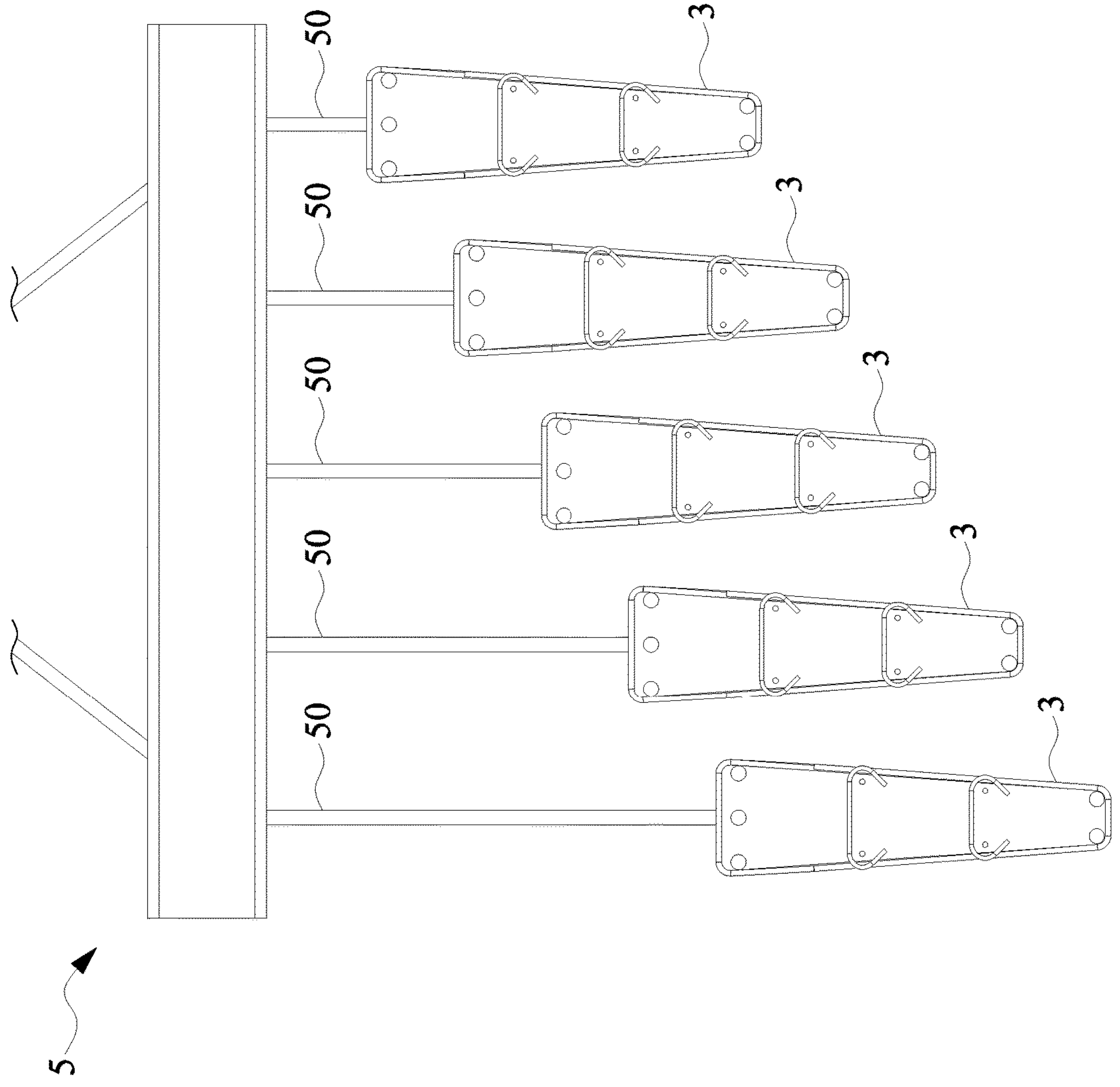
FIG. 4 is a schematic view showing a lifter hoisting multiple sets of first beam bars, in accordance with the embodiment of the present disclosure.

FIG. 4 is a schematic view showing a lifter 5 hoisting multiple sets of first sets of beam bars 3, in accordance with the embodiment of the present disclosure. FIG. 4 shows that multiple first sets of beam bars 3 arranged at intervals are lifted simultaneously by a lifter 5, and the lifter 5 is configured so that the heights of the multiple first sets of beam bars 3 on the lifter 5 are different. In this embodiment, the five first sets of beam bars 3 are hoisted by hanging ropes 50 of the lifter 5, and the heights of the five first sets of beam bars 3 gradually increase from the left side to the right side of FIG. 4. By this disposition of the first sets of beam bars 3 of different heights as shown in FIG. 4, more beam bars 3 can be hung on the lifter 5. In prior art, the first sets of beam bars 3 are arranged at the same height on the lifter 5 resulting in the lifter 5 needing to be raised and lowered repeatedly for placing the first sets of beam bars 3. In contrast, in this embodiment, with a slow descent in one action, the first sets of beam bars 3 are placed on the bottom mold 1 in sequence and thus the efficiency is improved. In some embodiments, the suspension rail 2 shown in FIG. 1 and FIG. 2 may also be transported to the bottom mold 1 by using the lifter 5.

Figure 5:
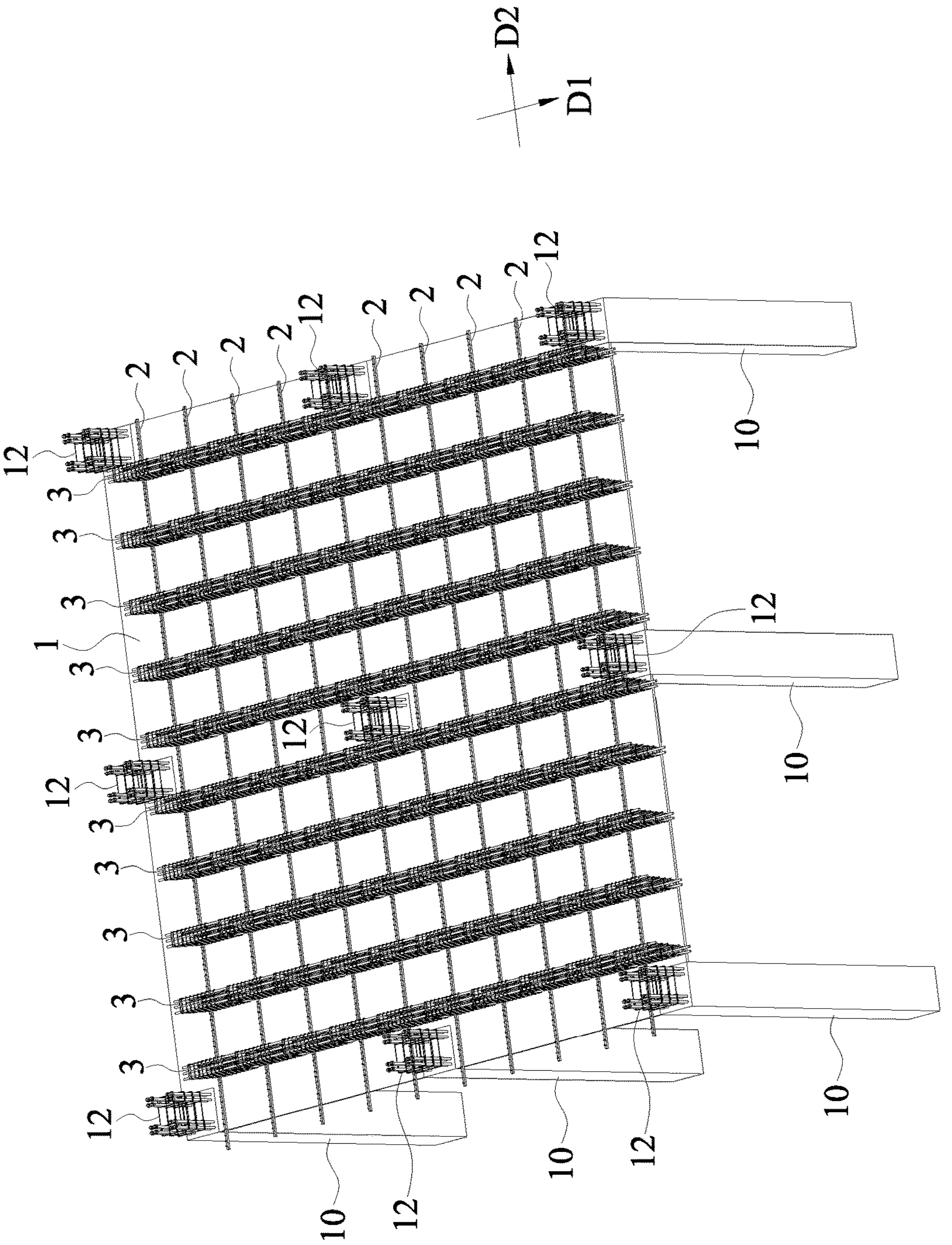
FIG. 5 is a further schematic view showing the embodiment of the present disclosure.

FIG. 5 is a further schematic view showing the embodiment of the present disclosure. FIG. 5 shows that multiple first sets of beam bars 3 are sequentially arranged parallel to each other along the first direction D1 on the bottom mold 1 and arranged at intervals at a predetermined distance.

Figure 6:
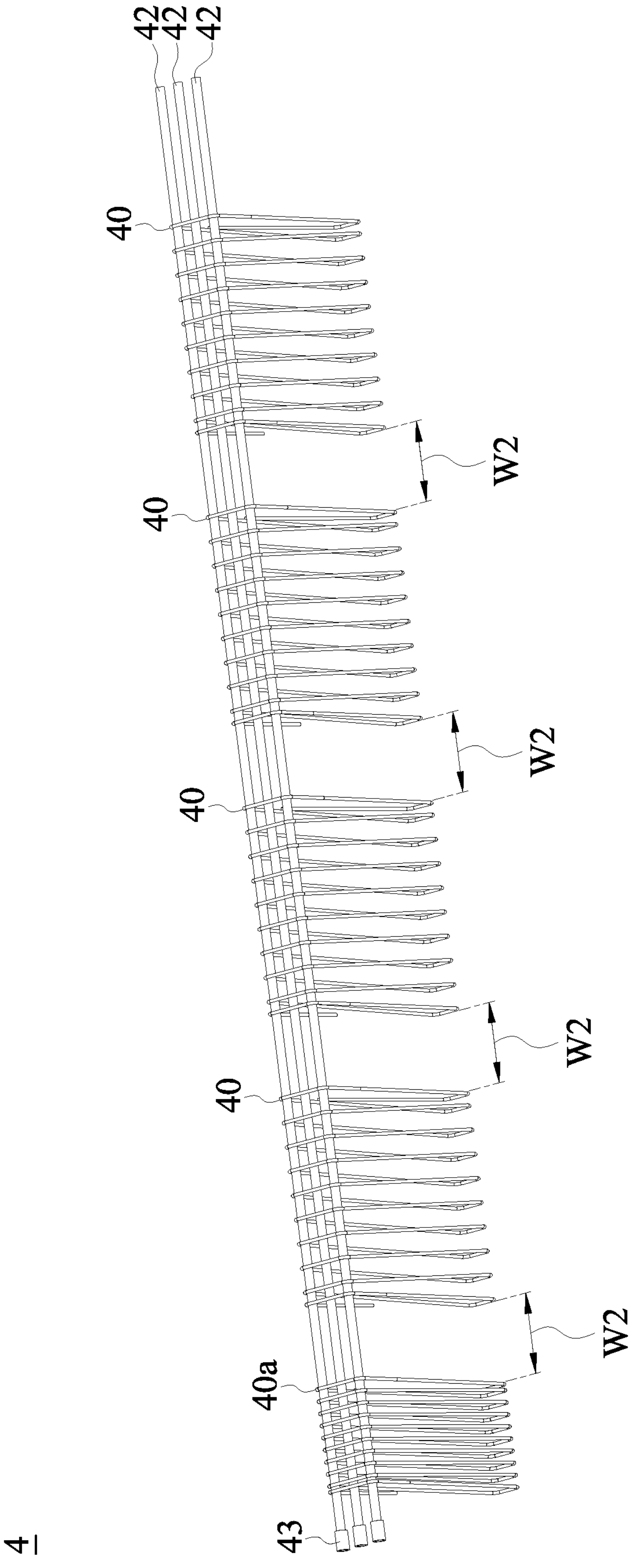
FIG. 6 is a schematically perspective view of a second set of beam bars, in accordance with the embodiment of the present disclosure.

FIG. 6 is a schematically perspective view of a second set of beam bars 4, in accordance with the embodiment of the present disclosure. The second set of beam bars 4 includes multiple second rebar cages 40, 40*a* arranged at intervals and multiple second upper rebars 42. In this embodiment, there are three second upper rebars 42 sequentially penetrating and supporting multiple second rebar cages 40, 40*a* from below. The multiple second rebar cages 40, 40*a* are separated from each other by a gap W2. In addition, multiple stirrups in the second reinforcement cage 40*a* at a far end (for example, the left side of FIG. 6) is denser than the other second reinforcement cages 40. At the left ends of second upper rebars 42, multiple connectors 43 are provided for connecting the corresponding second set of beam bars 4.

Figure 7:
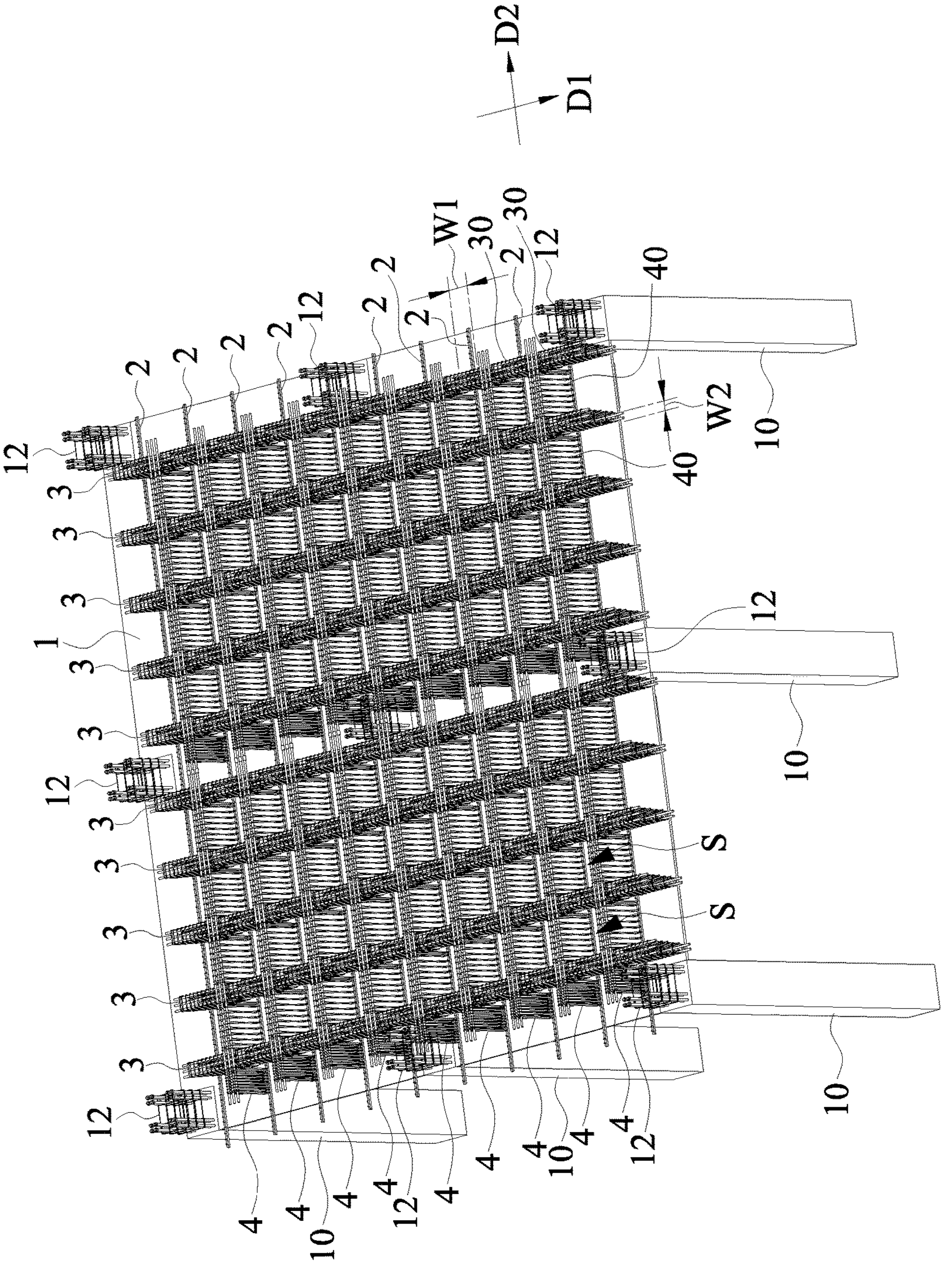
FIG. 7 is a still further schematic view showing the embodiment of the present disclosure.

FIG. 7 is a still further schematic view showing the embodiment of the present disclosure. FIG. 7 shows that multiple second sets of beam bars 4 are arranged along a second direction D2 on the bottom mold 1 and are parallel with each other and at intervals of a predetermined distance. Each of the multiple second sets of beam bars 4 are formed of two sections in serial connected by the multiple connectors 43 shown in FIG. 6.

As shown in FIG. 7, multiple second sets of beam bars 4 are configured to intersect with multiple first sets of beam bars 3, and do not interfere with each other. They are intersected at the gaps W1 between the multiple first rebar cages 30 and at the gaps W2 between the multiple second rebar cages 40. The multiple first sets of beam bars 3 and the multiple second sets of beam bars 4 form an interlaced structure and form multiple accommodating spaces S therein. In the embodiment shown in FIG. 1 and FIG. 2, multiple second sets of beam bars 4 are provided on the multiple supports 22 of the multiple rails 2 (see FIG. 2), which are on the bottom mold 1.

Figure 8:
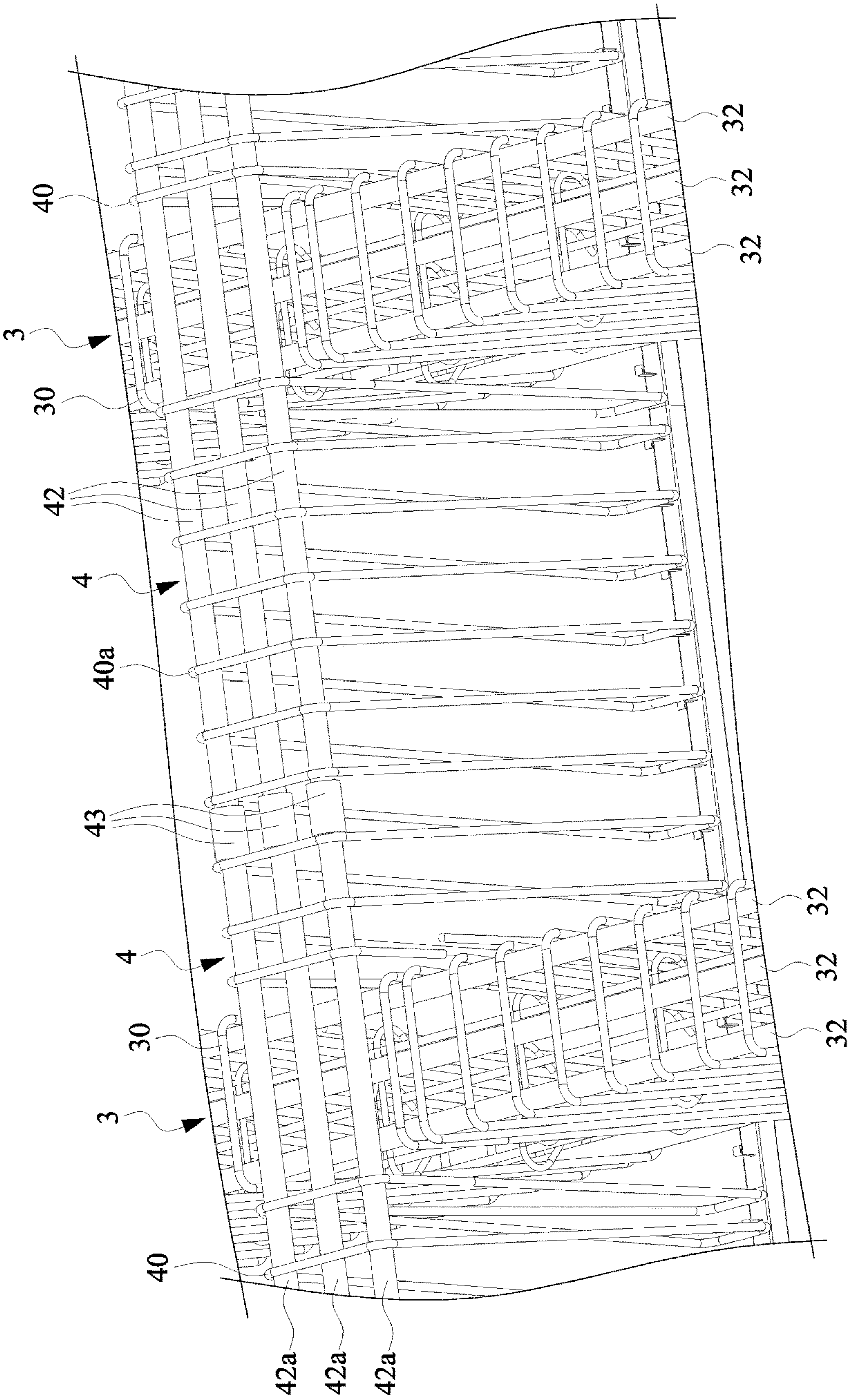
FIG. 8 is a partially enlarged schematic view of the structure shown in FIG. 7.

FIG. 8 is a partially enlarged schematic view of the structure shown in FIG. 7. FIG. 8 shows multiple second upper rebars 42 that sequentially penetrate multiple second rebar cages 40, and overlap multiple first upper rebars 32 of the first sets of beam bars 3. The overlapped portions of the multiple first upper rebars 32 are between two adjacent first rebar cages 30 of the first sets of beam bars 3. FIG. 8 shows that multiple connectors 43 are provided to connect the multiple second upper rebars 42 in a section of the second set of beam bars 4 to those of the other section of the second set of beam bars 4. In this embodiment, the pre-folded second rebar cage 40*a* in the section of the second set of beam bars 4 is stretched onto the other section of the multiple second upper rebars 42*a* of the second set of beam bars 4 on the left side of FIG. 8.

Figure 9:
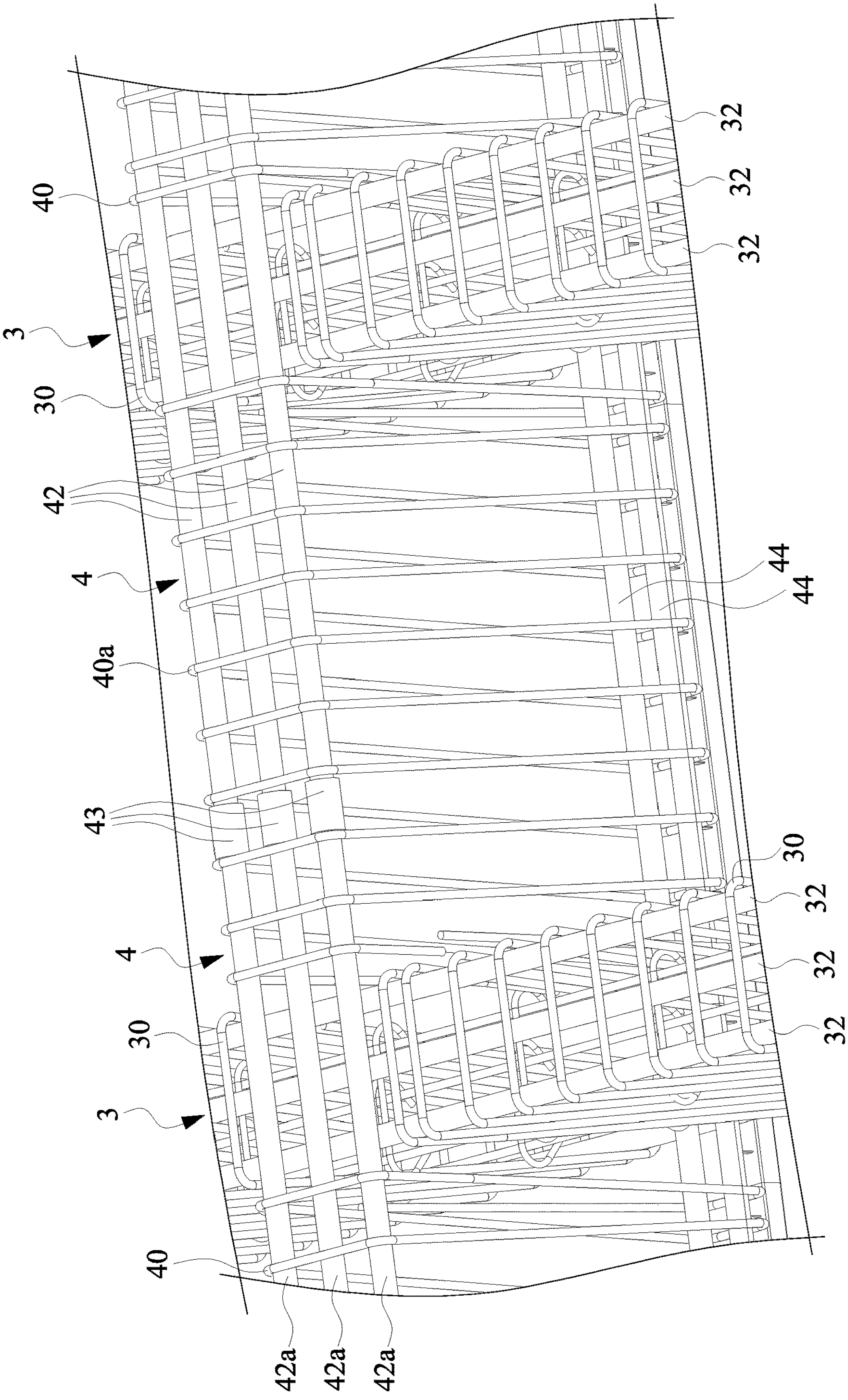
FIG. 9 is a still further schematic view showing the embodiment of the present disclosure.

FIG. 9 is a still further schematic view showing the embodiment of the present disclosure. FIG. 9 shows multiple second lower rebars 44 penetrating through the multiple second rebar cages 40, 40*a* and fixed to the lower portions of the multiple second rebar cages 40, 40*a*.

Figure 10:
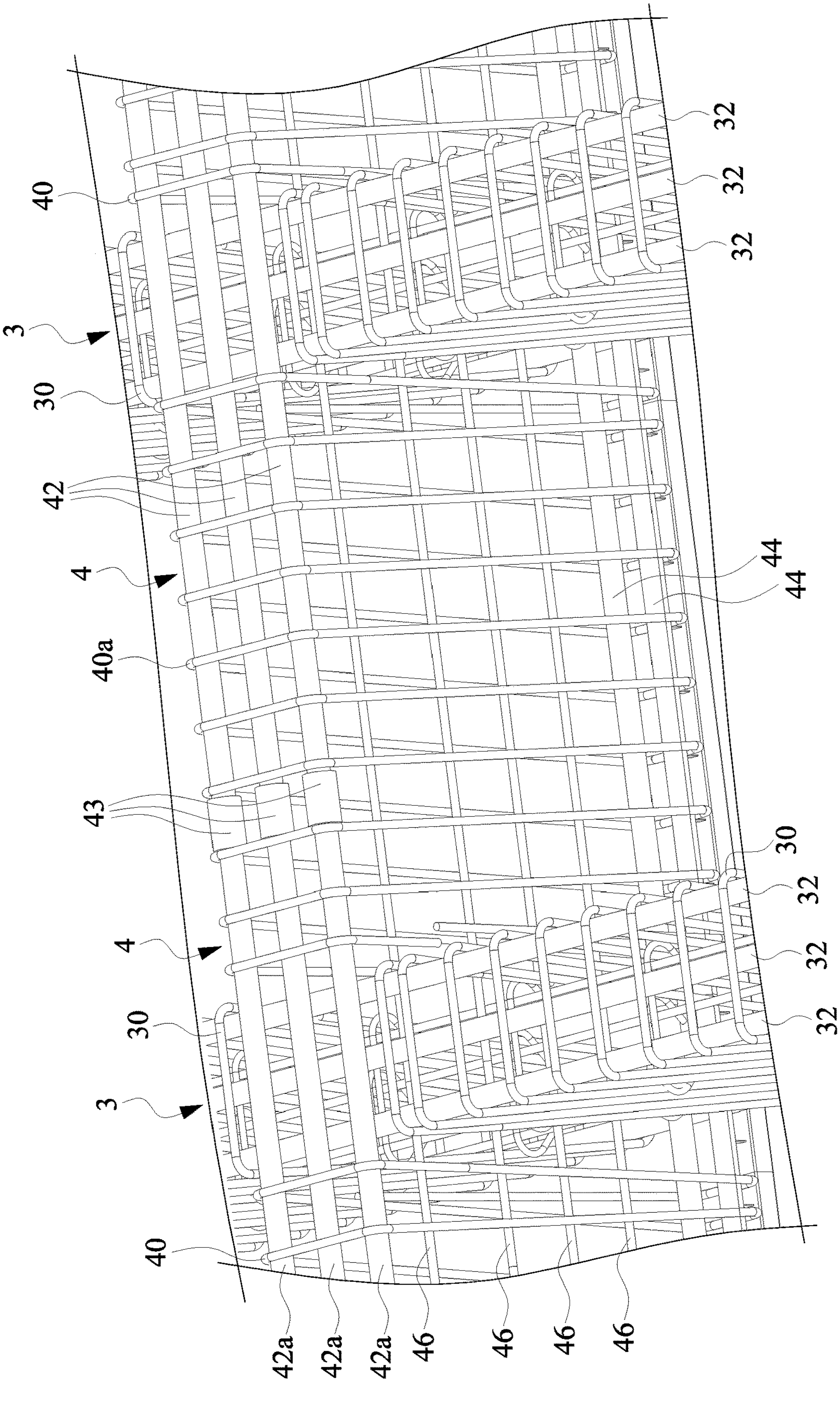
FIG. 10 is a still further schematic view showing the embodiment of the present disclosure.

FIG. 10 is a still further schematic view showing the embodiment of the present disclosure. FIG. 10 shows multiple second waist bars 46 affixed to the multiple second rebar cages 40, 40*a* of the second set of beam bars 4 and located between the multiple second upper rebars 42 and the multiple second lower rebars 44. The multiple second waist bars 46 are approximately parallel to the multiple second upper rebars 42 and the multiple second lower rebars 44.

Figure 11:
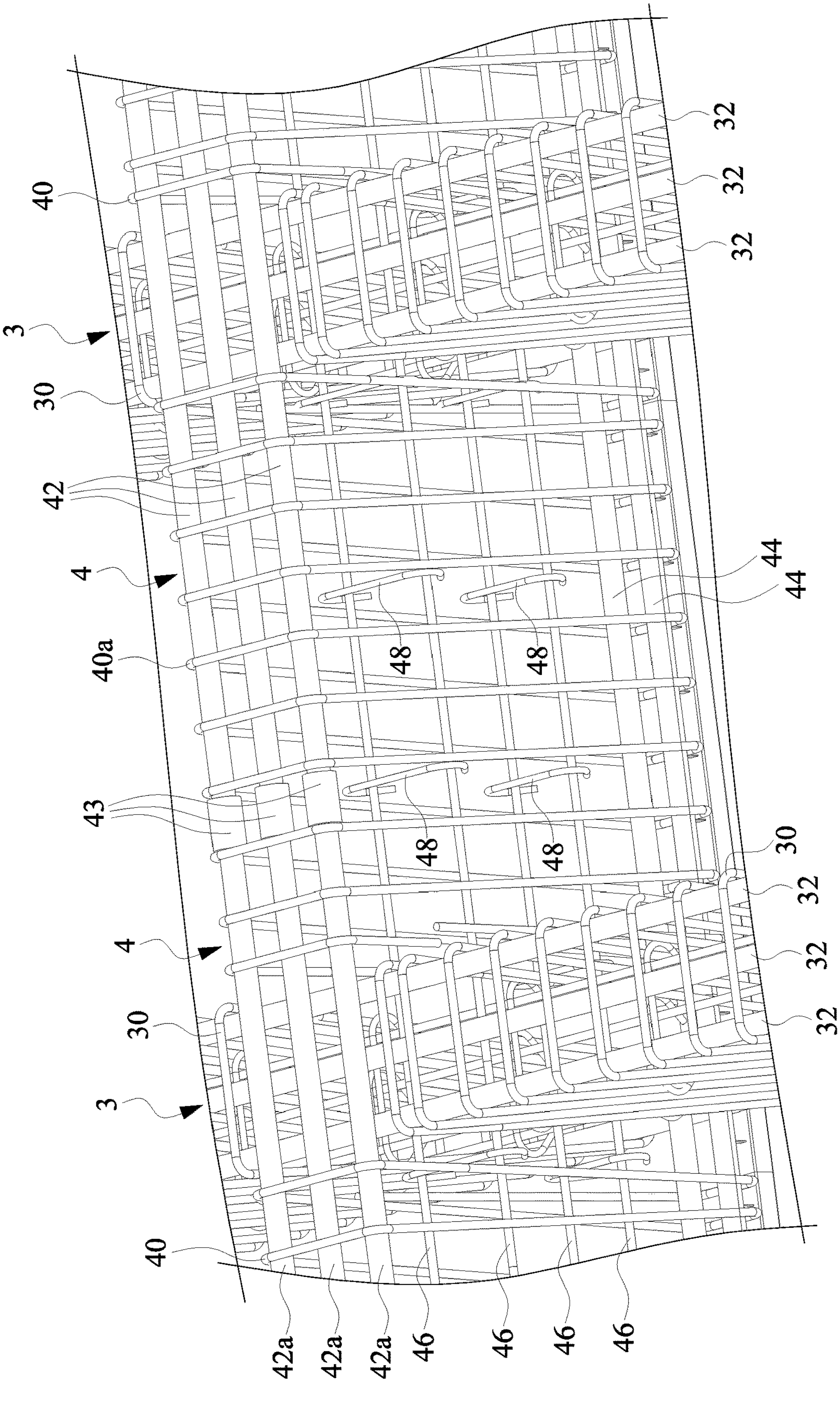
FIG. 11 is a still further schematic view showing the embodiment of the present disclosure.

FIG. 11 is a still further schematic view showing the embodiment of the present disclosure. FIG. 11 shows multiple second tie bars 48 used to fix a pair of second waist bars 46 respectively located on opposing sides of the second set of beam bars 4. In some embodiments, the multiple second tie bars 48 are U-shaped to hook the pairs of second waist bars 46 via the bent ends of the multiple second tie bars 48.

Figure 12:
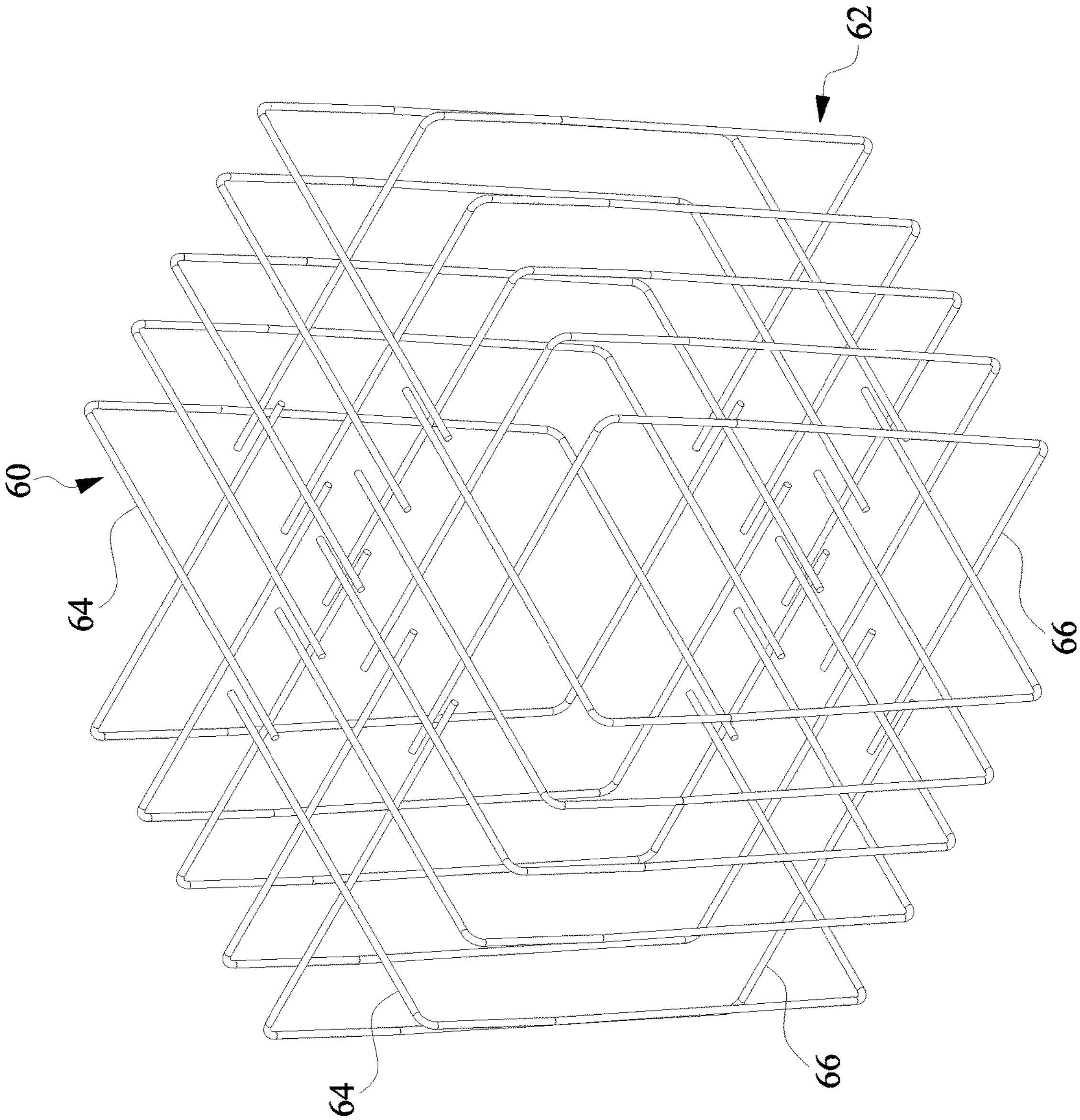
FIG. 12 is a schematic ally perspective view of a column tie bar, in accordance with the embodiment of the present disclosure.

FIG. 12 is a schematically perspective view of a column tie bar 6, in accordance with the embodiment of the present disclosure. The column tie bar 6 includes multiple first rectangular structures 60 arranged parallel to each other and multiple second rectangular structures 62 arranged parallel to each other. The multiple second rectangular structures 62 are substantially perpendicular to the multiple first rectangular structures 60. The first rectangular structure 60 may include two U-shaped bars 64 disposed opposite and connected to each other. The second rectangular structure 62 may include two U-shaped bars 66 disposed opposite and connected to each other.

Figure 13:
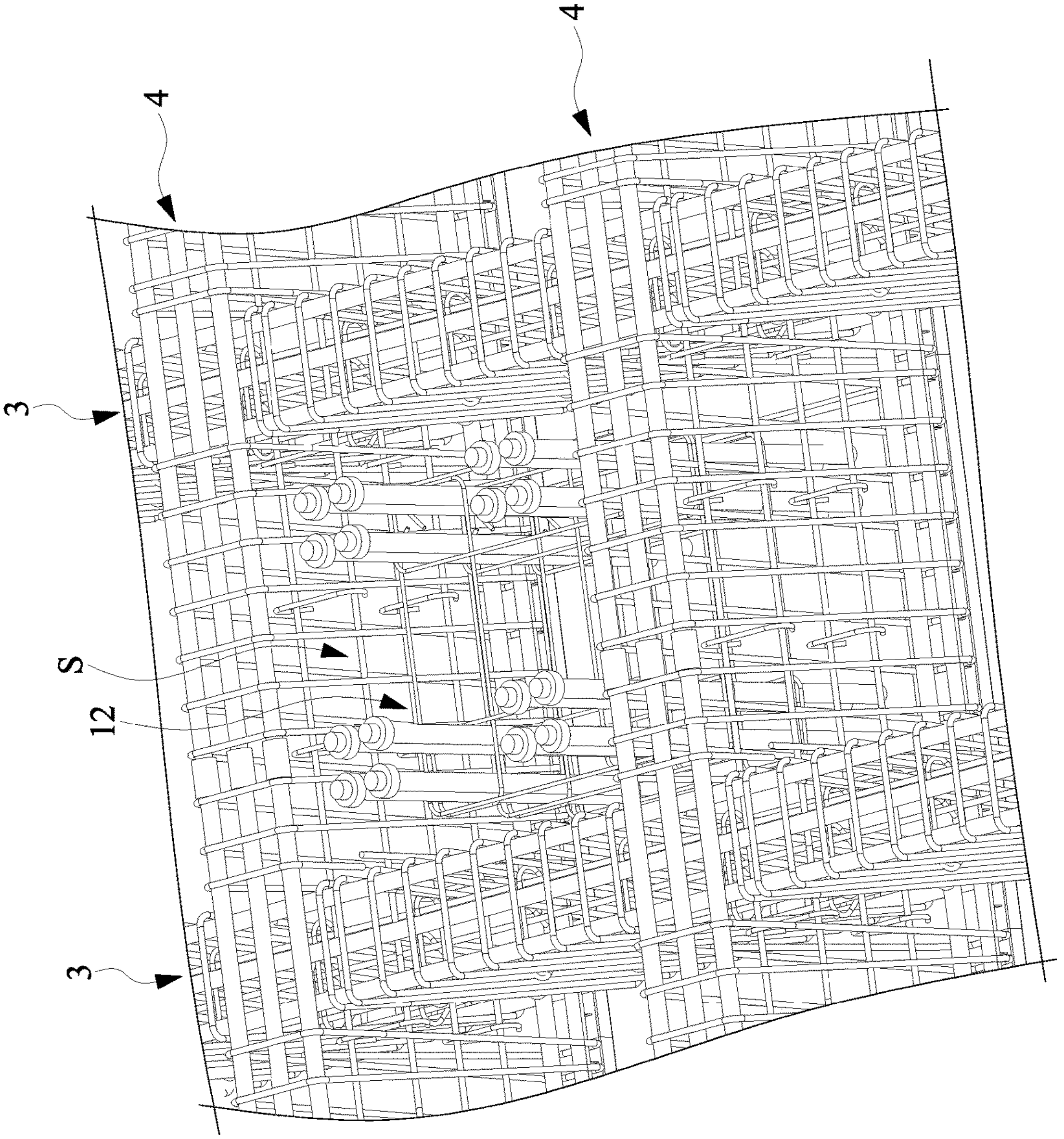
FIG. 13 is an enlarged schematic view showing a column joint, in accordance with the embodiment of the present disclosure.
Figure 14:
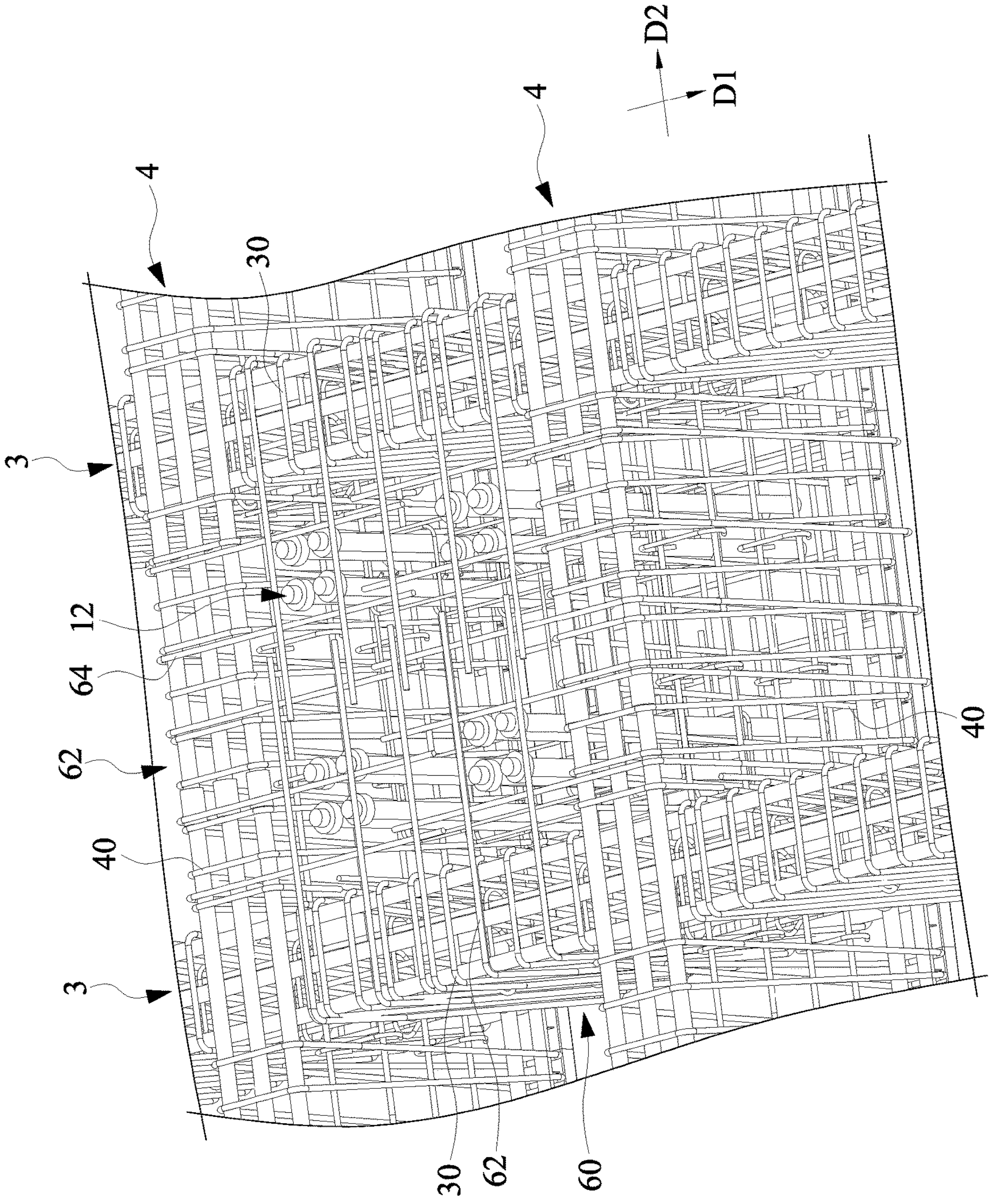
FIG. 14 is a still further schematic view showing the embodiment of the present disclosure.

FIG. 13 is an enlarged schematic view of a column joint 12, in accordance with the embodiment of the present disclosure. As shown in FIG. 13, the multiple first sets of beam bars 3 and the multiple second beam bars 4 surround the column joint 12 in the accommodating space S extending from the top of the column 10 (as shown in FIG. 1). FIG. 14 shows multiple first rectangular structures 60 along the second direction D2 and multiple second rectangular structures 62 along the first direction D1 from the outer sides of the multiple first rebar cages 30 and the outer sides of the multiple second rebar cages 40 to surround the lateral sides of the multiple joints 12.

Figure 15:
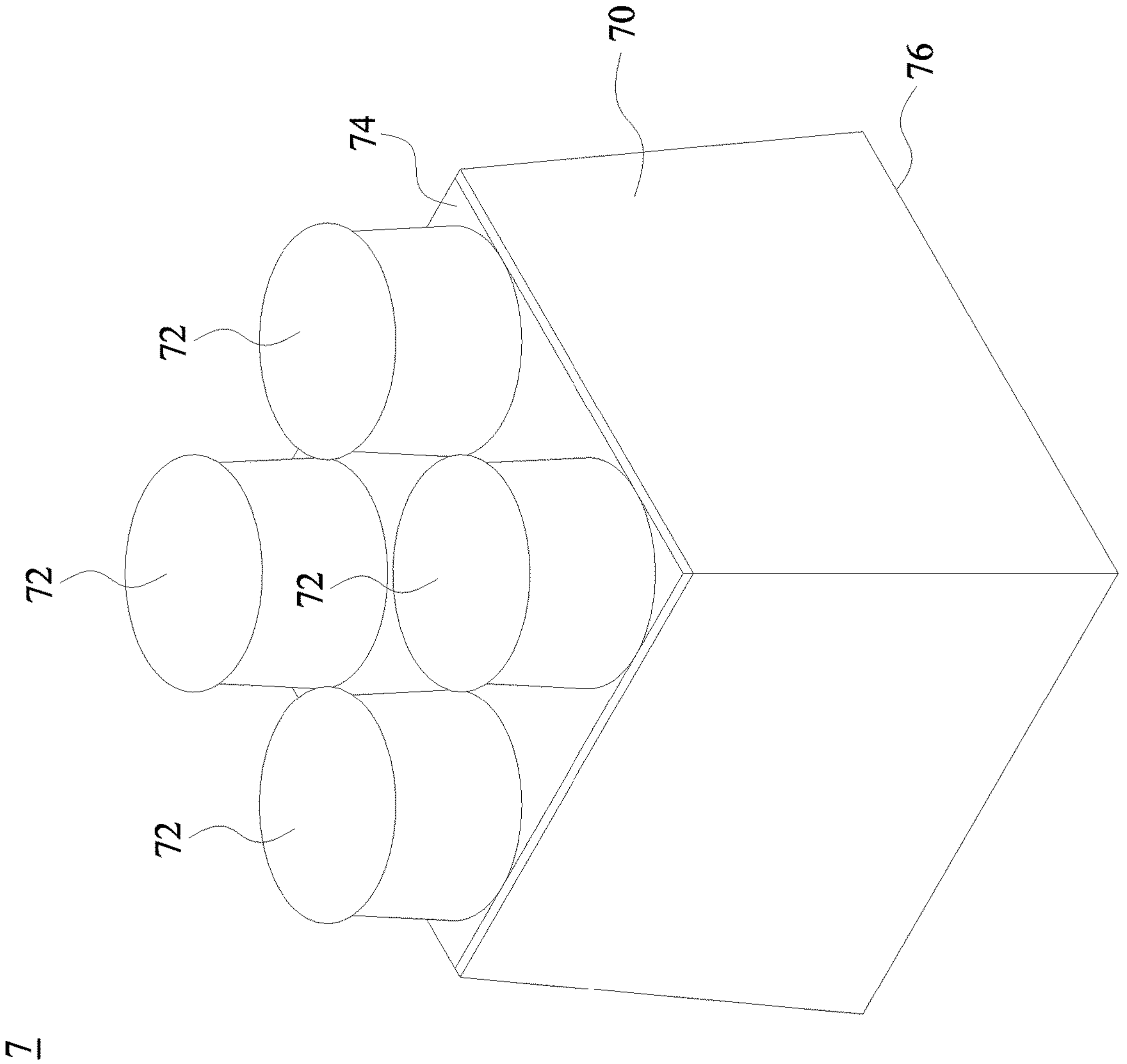
FIG. 15 is a schematic view of a waffle mold, in accordance with the embodiment of the present disclosure.

FIG. 15 is a schematic view showing a waffle mold 7, in accordance with the embodiment of the present disclosure. As shown in FIG. 15, the waffle mold 7 includes a hollow body 70 and multiple hollow cylinders 72 disposed on the top surface 74 of the hollow body 70. In this embodiment, four hollow cylinders 72 are evenly arranged on the hollow body 70 in a 2*x*2 pattern. The area of the bottom surface 76 of the hollow body 70 is larger than the area of the top surface 74, and the cross-sectional area of the hollow body 70 gradually decreases from its bottom to its top, forming a wedge-shaped quadrilateral.

Figure 16:
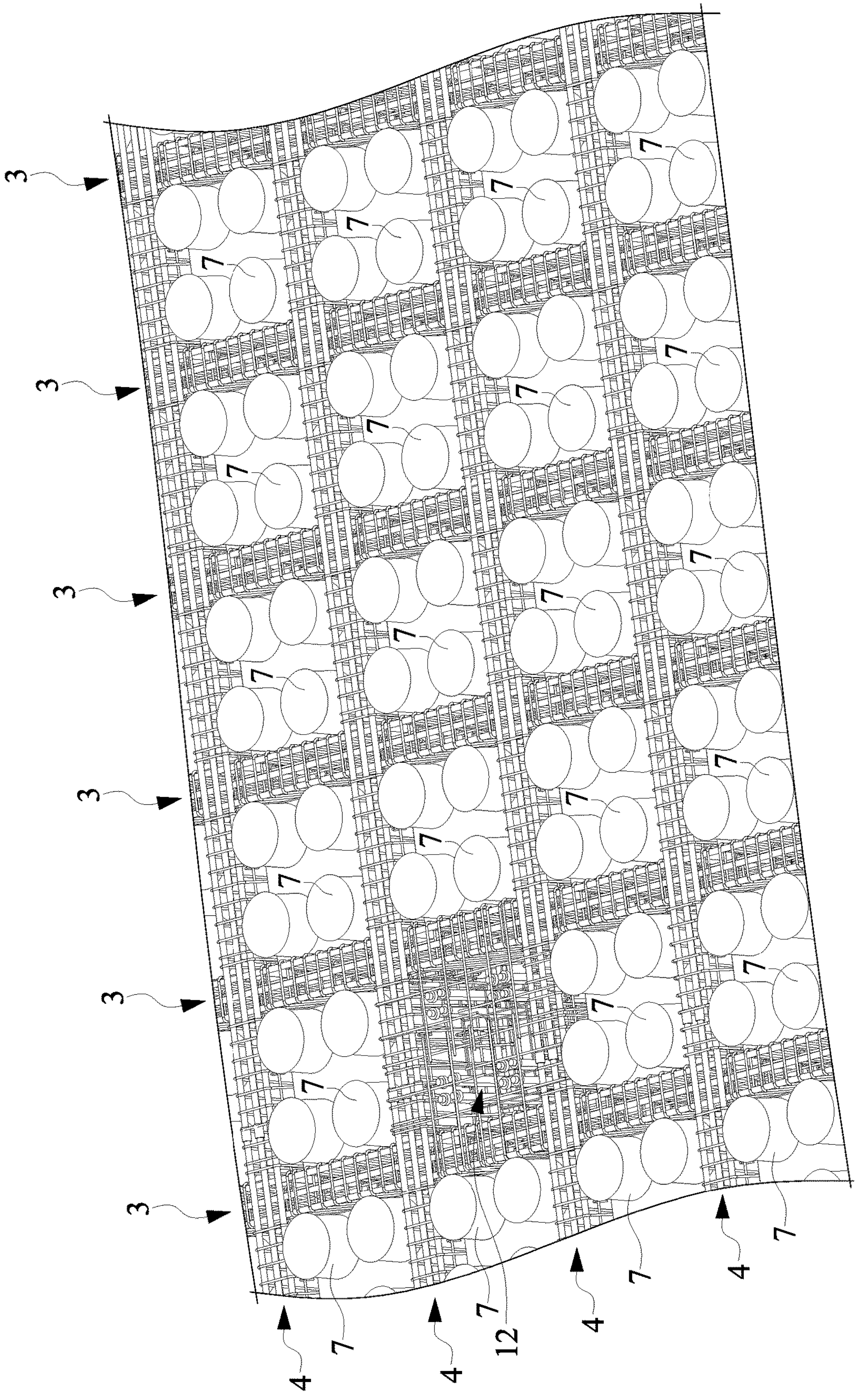
FIG. 16 is a still further schematic view showing the embodiment of the present disclosure.

FIG. 16 is a still further schematic view showing the embodiment of the present disclosure. FIG. 16 shows multiple waffle molds 7 provided in multiple accommodating spaces S defined by the multiple first sets of beam bars 3 and the multiple second sets of beam bars 4. In this embodiment, no waffle mold 7 is provided at the column joint 12.

Figure 17:
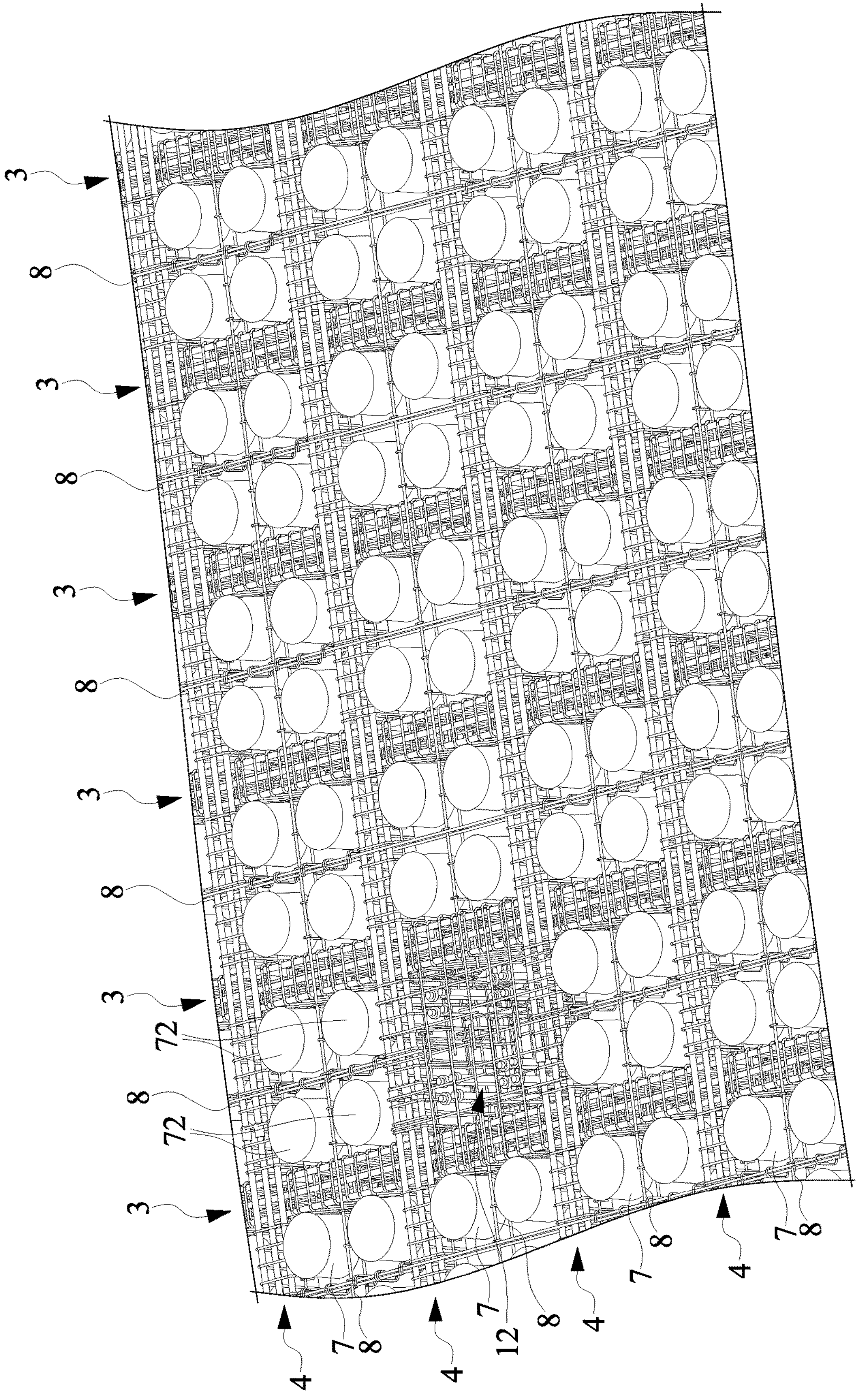
FIG. 17 is a still further schematic view showing the embodiment of the present disclosure.

FIG. 17 is a still further schematic view showing the embodiment of the present disclosure. FIG. 17 shows multiple reinforcing bars 8 arranged between the multiple hollow cylinders 72 of a waffle mold 7, and extending between the hollow cylinders 72 of the adjacent waffle molds 7. In addition, the multiple reinforcing bars 8 span over the multiple first sets of beam bars 3 or the multiple second sets of beam bars 4.

Figure 18:
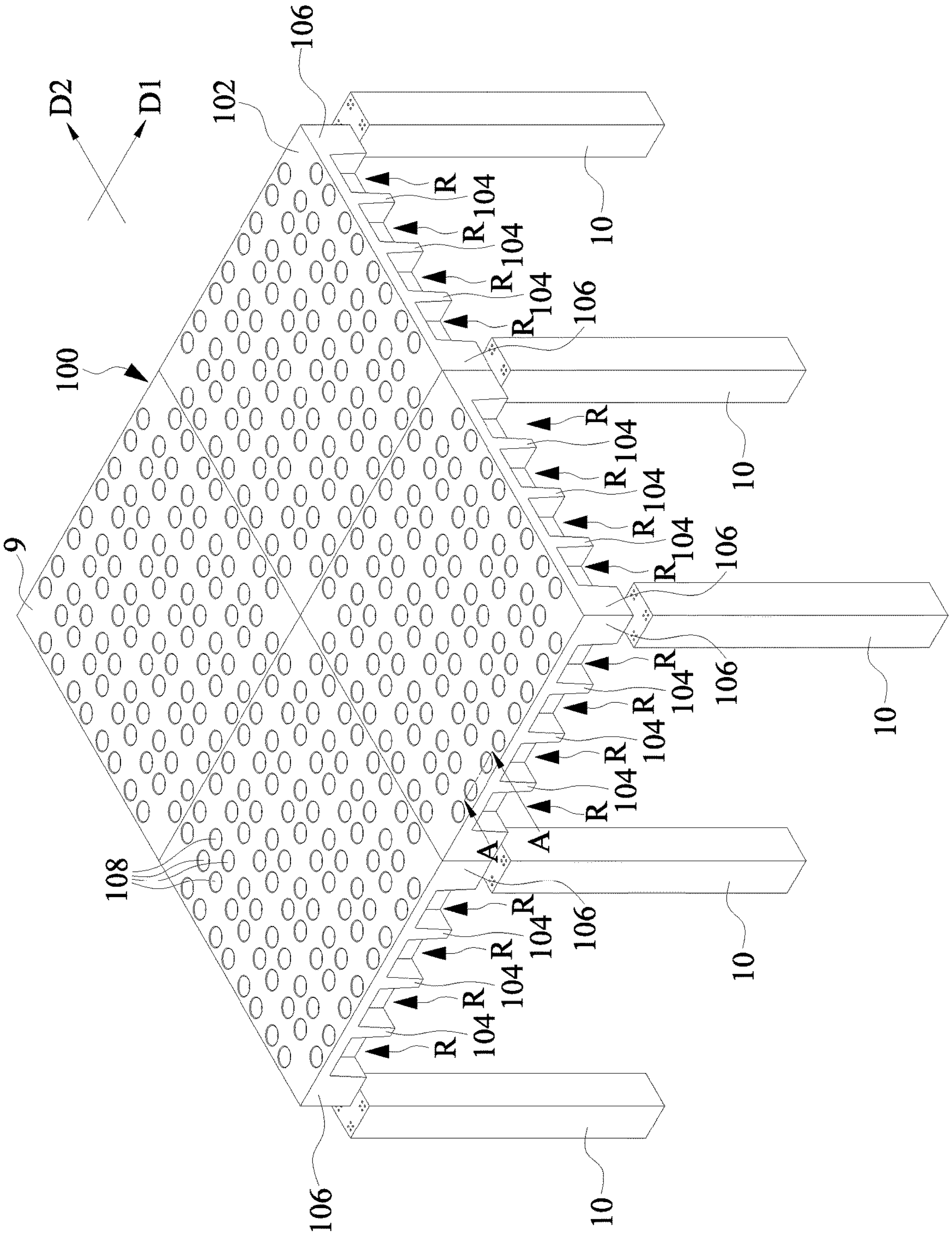
FIG. 18 is a schematically perspective view showing the embodiment of the present disclosure.

FIG. 18 is a schematically perspective view showing the embodiment of the present disclosure. FIG. 18 shows concrete 9 poured into the molds (not shown) surrounding the plane and solidified so that the concrete 9 covers the aforementioned multiple first sets of beam bars 3, the multiple second sets of beam bars 4 and the multiple waffle molds 7. After the concrete 9 has solidified, the bottom mold 1 and the multiple waffle molds 7 are removed to form the waffle slab 100. As shown in FIG. 18, the waffle slab 100 includes a top plate portion 102, multiple supporting ribs 104 and supporting blocks 106. The supporting ribs 104 and the supporting blocks 106 are located on the bottom surface of the top plate portion 102. The positions of the supporting blocks 106 correspond to the positions of the columns 10 below. The multiple supporting ribs 104 extend along the first direction D1 and the second direction D2, and form a recess R therebetween. The top plate portion 100 has multiple through holes 108. In this embodiment, the location of each of the recesses R corresponds to that of a row of waffle molds 7 in the first direction D1 or the second direction D2 before the waffle molds 7 are removed.

Figure 19:
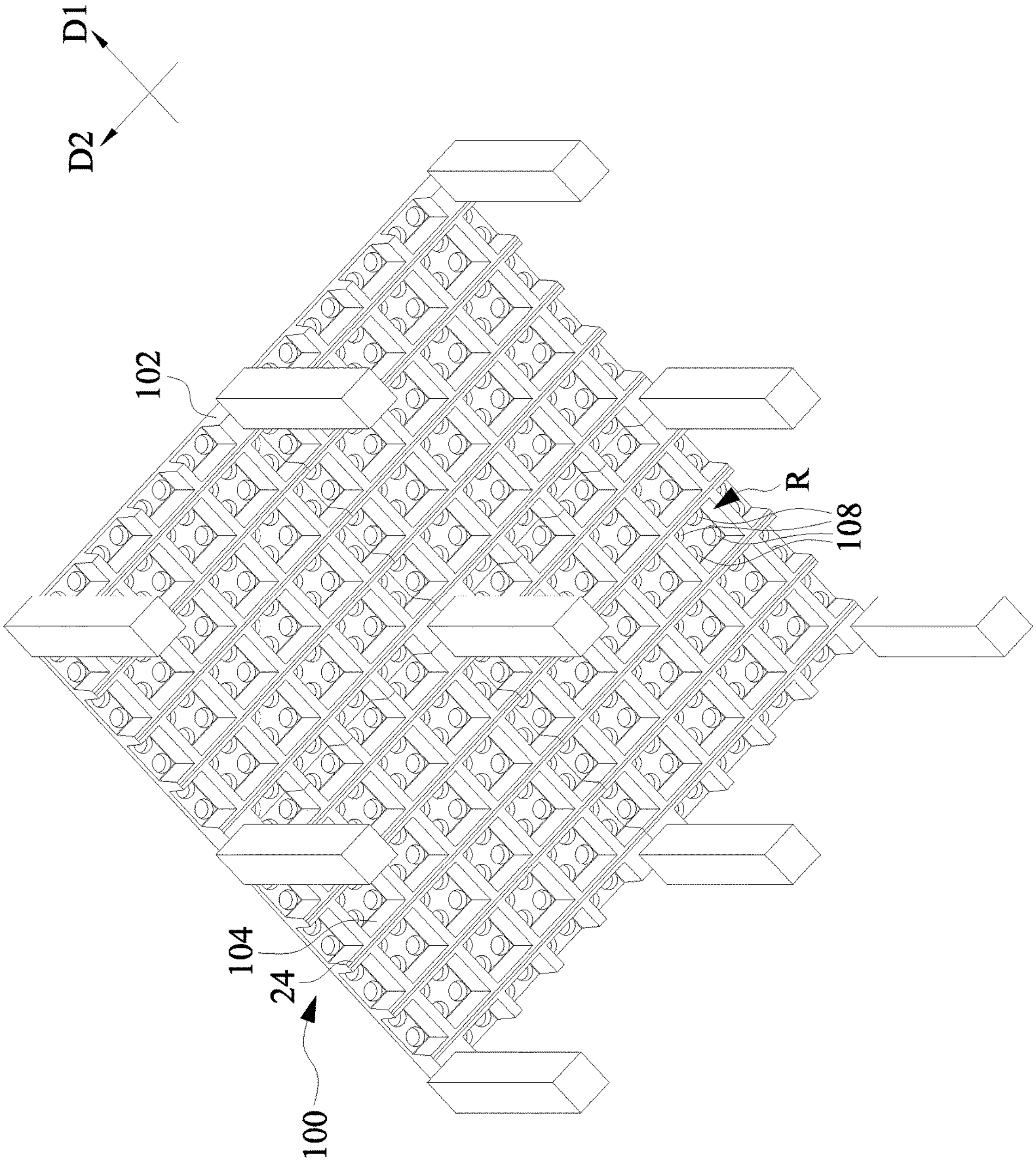
FIG. 19 is a schematic bottom view of the structure shown in FIG. 18.
Figure 20:
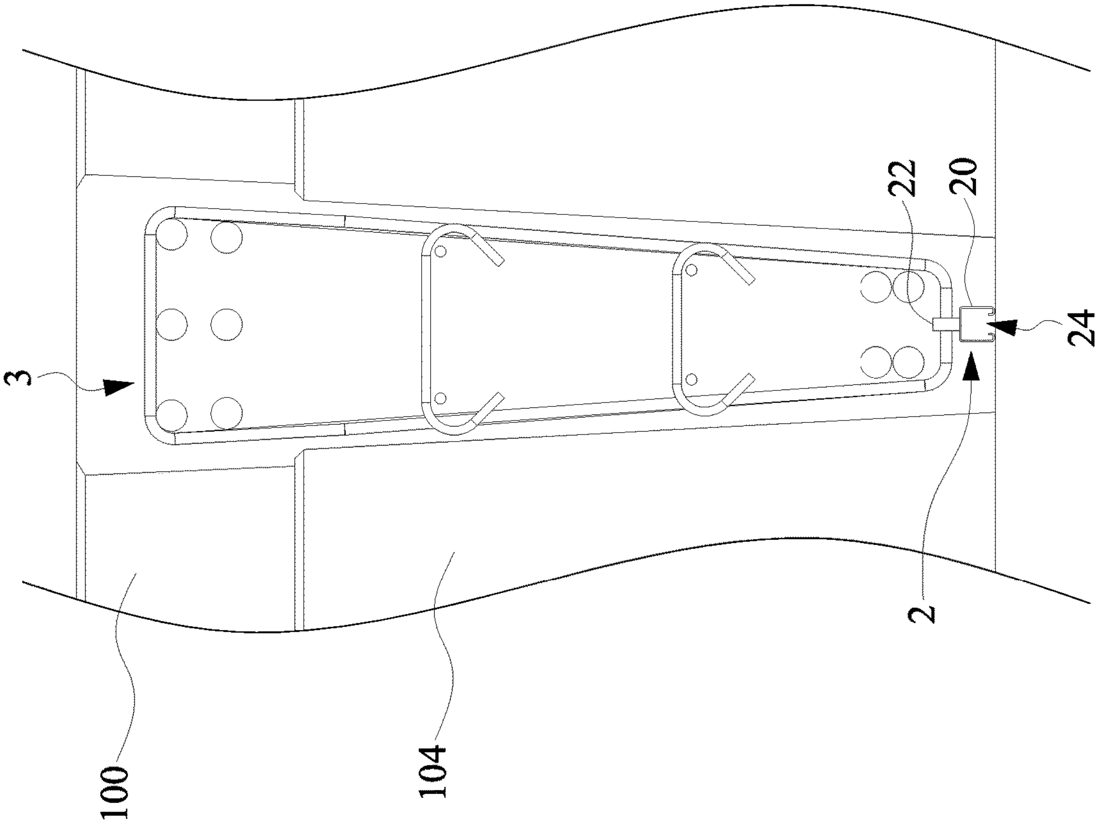
FIG. 20 is a partial cross-sectional view of FIG. 18 along line A-A.

FIG. 19 is a schematic bottom view of the structure shown in FIG. 18. FIG. 20 is a partial cross-sectional view of FIG. 18 along line A-A. As shown in FIG. 19 and FIG. 20, the opening 24 of the elongated trough-shaped body 20 of the suspension rail 2 is configured to be exposed from the bottom surface of the supporting bar 104 for connecting other devices.

The term "a" or "an" herein is used to describe elements and components of the present disclosure. This term is only for the convenience of description and to give the basic concept of this disclosure. Such a statement should be read to include one or at least one, and the singular also includes the plural unless it is clearly stated otherwise. When used together with the word "comprising" in the claims, the word "a" may mean one or more than one. In addition, the term "or" herein means "and/or."

Unless otherwise specified, terms such as "above," "below," "upward," "left," "right," "downward," "body," "base," "vertical," "horizontal," "side," "higher," "lower," "upper," "above" and "below" are spatial descriptions intended to indicate the directions shown in the drawings. It should be understood that the spatial descriptions used herein are for illustrative purposes only, and that actual implementations of the structures described herein may be spatially configured in any relative orientation, such constraints not altering the advantages of the disclosed embodiments. For example, in descriptions of some embodiments, providing an element "on" another element may encompass situations where the former element is directly on (e.g., in physical contact with) the latter element as well as a situation where a plurality of intervening elements are disposed between the former element and the latter element.

As used herein, the terms "approximately," "substantially," "substantial" and "about" are used to describe and allow for minor variations. When used in conjunction with an event or circumstance, these terms can mean both instances in which the event or circumstance expressly occurred as well as instances in which the event or circumstance occurred in close proximity.

The present disclosure is not limited to the specific structure or arrangement disclosed herein, and those with ordinary knowledge in the art of the present disclosure should understand that, under the spirit of the present disclosure, these structures and arrangements disclosed herein must be within certain limits, and that the extent may be altered or substituted. It should also be understood that the terminology used herein and the terms describing directions or relative positions are only used to describe specific embodiments and facilitate explanation and understanding, and are not intended to limit the scope of the present disclosure.

What is claimed is:

1. A method of manufacturing a waffle slab on a plurality of columns at intervals, the method comprising:

disposing a bottom mold separately on the plurality of columns and exposing joint heads of the plurality of columns from a top surface of the bottom mold;

disposing a plurality of first sets of beam bars separately on the bottom mold so that the plurality of first sets of beam bars are parallel to each other along a first direction, wherein the plurality of first sets of beam bars each comprises:

a plurality of first rebar cages disposed along the first direction at intervals, and a plurality of first upper rebars and a plurality of first lower rebars that both penetrate through an inside of the plurality of first rebar cages and are respectively affixed to upper portions and lower portions of the plurality of first rebar cages;

disposing a plurality of second sets of beam bars separately on the bottom mold so that the plurality of second sets of beam bars are parallel to each other along a second direction, the second direction being different from the first direction, wherein the plurality of second sets of beam bars each comprises:

a plurality of second rebar cages separately disposed along the second direction; and a plurality of second upper rebars penetrating through an inside of the plurality of second rebar cages and affixed to upper portions of plurality of the second rebar cages, wherein the plurality of second upper rebars are attached to parts of the plurality of first upper rebars that are located between two of the plurality of first rebar cages; and providing and penetrating a plurality of second lower rebars through an inside of the plurality of second rebar cages and affixing the plurality of second lower rebars to the lower portions of the plurality of the second rebar cages;

wherein the plurality of second sets of beam bars are configured to intersect with the plurality of first sets of beam bars without interference, so that the plurality of first sets of beam bars and the plurality of second sets of beam bars together form a plurality of accommodation spaces therebetween.

2. The method of claim 1, further comprising:

providing a plurality of waffle molds into the plurality of accommodation spaces;

pouring concrete to cover the plurality of first sets of beam bars, the plurality of second sets of beam bars and the plurality of accommodation spaces; and removing the bottom mold and the plurality of waffle molds after the concrete is solidified.

3. The method of claim 2, before the step of providing the plurality of first sets of beam bars and the plurality of second sets of beam bars, further comprising:

providing a plurality of rails on the bottom mold along the second direction, wherein each of the plurality of rails includes an elongated trough-shaped body and a plurality of supports on the elongated trough-shaped body, wherein the elongated trough-shaped body has an opening therein and the plurality of supports are located on the opposite side of the opening;

wherein the plurality of second sets of beam bars are disposed on the plurality of supports of the rails, and the opening of the elongated trough-shaped body is configured to face the bottom mold.

4. The method of claim 2, wherein the step of providing the plurality of first sets of beam bars further comprises:

hoisting the plurality of first sets of beam bars at intervals simultaneously with a lifter, configured so that the heights of the plurality of first sets of beam bars are different; and disposing the plurality of first sets of beam bars on the bottom mold in order.

5. The method of claim 2, wherein the step of providing the plurality of second sets of beam bars further comprises:

providing a plurality of couplers to connect segments of the plurality of second upper rebars in series in each of the plurality of second rebar cages.

6. A structure for manufacturing a waffle slab, comprising:

a bottom mold disposed on a plurality of columns disposed at intervals, wherein a joint head of each of the plurality of columns is exposed from a top surface of the bottom mold;

a plurality of first sets of beam bars disposed separately on the bottom mold that are parallel to each other along a first direction, wherein the plurality of first sets of beam bars each comprises:

a plurality of first rebar cages disposed along the first direction at intervals, and a plurality of first upper rebars and a plurality of first lower rebars that both penetrate through an inside of the plurality of first rebar cages and are respectively affixed to upper portions and lower portions of the plurality of first rebar cages;

a plurality of second sets of beam bars disposed separately on the bottom mold that are parallel to each other along a second direction, the second direction being different from the first direction, wherein the plurality of second sets of beam bars each comprises:

a plurality of second rebar cages separately disposed along the second direction; and a plurality of second upper rebars and a plurality of second lower rebars that both penetrate through an inside of the plurality of second rebar cages and are respectively affixed to upper portions and lower portions of the plurality of second rebar cages, wherein the plurality of second upper rebars are attached to parts of the plurality of first upper rebars that are located between two of the plurality of first rebar cages;

wherein the plurality of second sets of beam bars are configured to intersect with the plurality of first sets of beam bars without interference, so that the plurality of first sets of beam bars and the plurality of second sets of beam bars together form a plurality of accommodation spaces therebetween.

7. The structure of claim 6, further comprising a plurality of waffle molds disposed in the plurality of accommodation spaces.

8. The structure of claim 6, further comprising:

a plurality of rails on the bottom mold along the second direction, wherein each of the plurality of rails includes an elongated trough-shaped body and a plurality of supports on the elongated trough-shaped body, wherein the elongated trough-shaped body has an opening and the plurality of supports are located on the opposite side of the opening;

wherein the plurality of second beam sets are disposed on the plurality of supports of the rails, and the opening of the elongated trough-shaped body is configured to face the bottom mold.

9. The structure of claim 6, further comprising:

a plurality of waist bars disposed between and being generally parallel with the plurality of second upper rebars and the plurality of second lower rebars, and;

a plurality of tie bars configured to secure the positions of the plurality of waist bars.

10. The structure of claim 6, further comprising:

a plurality of column tie bars including a plurality of first rectangular structures disposed parallel to each other and a plurality of second rectangular structures substantially vertically disposed and fixed to the plurality of first rectangular structures;

wherein the plurality of first rectangular structures and the plurality of second rectangular structures are configured to surround sides of the joint heads.

11. The structure of claim 10, wherein the plurality of first rectangular structures and the plurality of second rectangular structures are configured to be secured to the portions of the plurality of first sets of beam bars and the plurality of second sets of beam bars that surround the joint heads.

12. The structure of claim 10, wherein each of the plurality of first rectangular structures and the plurality of second rectangular structures are formed of two U-shaped bars connected to each other.

13. The structure of claim 6, wherein the second direction is generally perpendicular to the first direction.

14. The structure of claim 7, wherein the plurality of waffle molds includes a hollow body and a plurality of hollow cylinders disposed on the hollow body, and the structure further comprises a plurality of reinforcing bars disposed on the plurality of waffle molds between the hollow cylinders.

* * * * *